US005684699A

United States Patent [19]

Sugiyama

[11] Patent Number: 5,684,699
[45] Date of Patent: Nov. 4, 1997

[54] TRAVEL CHARACTERISTIC CONTROL SYSTEM FOR AUTOMOTIVE VEHICLE

[75] Inventor: Mizuho Sugiyama, Toyota, Japan

[73] Assignee: Toyota Jidosha Kabushiki Kaisha, Toyota, Japan

[21] Appl. No.: 3,700

[22] Filed: Jan. 13, 1993

[30] Foreign Application Priority Data

Jan. 14, 1992 [JP] Japan .................. 4-004612

[51] Int. Cl.$^6$ .................. G06F 15/00; G06F 17/17
[52] U.S. Cl. .................. 364/424.051; 364/424.032; 364/424.088; 364/424.097; 364/423.098; 364/424.045; 180/447; 395/22; 395/24; 395/905
[58] Field of Search .................. 364/424.01, 424.03, 364/424.05, 453, 423, 449, 426.03, 450, 421.01, 423.098, 424.088, 424.087, 424.097; 180/447; 395/24, 22, 11, 905

[56] References Cited

U.S. PATENT DOCUMENTS

| | | | |
|---|---|---|---|
| 4,412,594 | 11/1983 | Furukawa et al. | 180/140 |
| 4,713,767 | 12/1987 | Sato et al. | 364/453 |
| 4,754,828 | 7/1988 | Morishita et al. | 364/424.05 |
| 4,777,585 | 10/1988 | Kokawa et al. | 364/164 |
| 4,779,202 | 10/1988 | Leiber | 364/426.03 |
| 4,796,191 | 1/1989 | Honey et al. | 364/450 |
| 4,809,175 | 2/1989 | Hosaka et al. | 364/424 |
| 4,825,367 | 4/1989 | Nagaoka et al. | 364/426.03 |
| 5,019,979 | 5/1991 | Takahashi | 364/424.1 |
| 5,065,325 | 11/1991 | Takahashi | 364/424.03 |
| 5,099,428 | 3/1992 | Takahashi | 364/424.1 |
| 5,122,960 | 6/1992 | Ooka | 364/453 |
| 5,155,802 | 10/1992 | Mueller et al. | 395/24 |
| 5,162,997 | 11/1992 | Takahashi | 364/424.05 |
| 5,172,322 | 12/1992 | Takano et al. | 364/453 |
| 5,172,785 | 12/1992 | Takahashi | 180/141 |
| 5,261,503 | 11/1993 | Yasui | 364/424.05 |
| 5,285,523 | 2/1994 | Takahashi | 364/421.01 |
| 5,410,477 | 4/1995 | Ishii et al. | 364/424.01 |

FOREIGN PATENT DOCUMENTS

| | | |
|---|---|---|
| 3300640 | 1/1983 | Germany . |
| 3610461 | 3/1986 | Germany . |
| 4120069 | 6/1991 | Germany . |
| 63-097471 | 4/1988 | Japan . |
| 02074469 | 3/1990 | Japan . |

OTHER PUBLICATIONS

Nijhuis et al., "Evaluation of Fuzzy and Neural Vehicle Control", IEEE, 1992, pp. 447–452.

Primary Examiner—Kevin J. Teska
Assistant Examiner—Thai Phan
Attorney, Agent, or Firm—Cushman, Darby & Cushman IP Group of Pillsbury Madison & Sutro LLP

[57] ABSTRACT

An electric control system for controlling a travel characteristic of an automotive vehicle, wherein a driving condition, movement conditions and a travel course of the vehicle are detected and a number of parameters indicative of a resultant of learning based on a teacher data are memorized, and wherein a neural network is adapted to estimate a characteristic index indicative of a driving characteristic of the driver on a basis of the memorized parameters and the detected driving condition and travel course of the vehicle. In the control system, a control signal for control of the travel characteristic of the vehicle is produced in accordance with the detected movement conditions of the vehicle and corrected in accordance with the estimated characteristic index.

7 Claims, 6 Drawing Sheets

TRAVEL CHARACTERISTIC CONTROL SYSTEM FOR AUTOMOTIVE VEHICLE

BACKGROUND OF THE INVENTION

1. Field of the Invention

The present invention relates to an electric control system for controlling a travel characteristic of an automotive vehicle in accordance with movement conditions of the vehicle such as a travel speed, a yaw-rate, a lateral acceleration and the like.

2. Discussion of the Prior Art

Disclosed in Japanese Patent Laid-open Publication No. 63-97471 is an electric control system of this kind in which a mode selection switch is provided adjacent the driver's seat to select a two-wheel steering mode or a four-wheel steering mode for controlling a travel characteristic of the vehicle In such a manner that the rear road wheels of the vehicle are maintained in a neutral position at the two-wheel steering mode and steered in response to steerage of the front road wheels at the four-wheel steering mode. In such a conventional control system, however, it is required to operate the mode selection switch during travel of the vehicle. Although in the control system the travel characteristic of the vehicle can be selected, it is difficult to more precisely control the travel characteristic in accordance with the driver's requirements.

SUMMARY OF THE INVENTION

It is, therefore, a primary object of the present invention to provide an electric control system for an automotive vehicle wherein a neural network is adapted to more precisely control the travel characteristic of the vehicle.

According to the present invention, the object is accomplished by providing an electric control system for controlling a travel characteristic of an automotive vehicle, which control system comprises first detection means for detecting a driving condition of the vehicle; second detection means for detecting movement conditions of the vehicle; third detection means for detecting a travel course of the vehicle; memory means for memorizing a number of parameters indicative of a resultant of learning based on a teacher data; a neural network for estimating a characteristic index indicative of a driving characteristic of a driver on a basis of the memorized parameters, the detected driving condition and the detected travel course; means for producing a control signal for control of the travel characteristic of the vehicle in accordance with the detected movement conditions of the vehicle; and correction means for correcting the control signal in accordance with the estimated characteristic index.

BRIEF DESCRIPTION OF THE DRAWINGS

Additional objects, features and advantages of the present invention will be more readily appreciated from the following detailed description of a preferred embodiment thereof when taken together with the accompanying drawings, in which:

FIG. 8 is a graph showing a steering angle of the vehicle handle in relation to the driving characteristic of the driver;

DESCRIPTION OF THE PREFERRED EMBODIMENT

Figure 1:
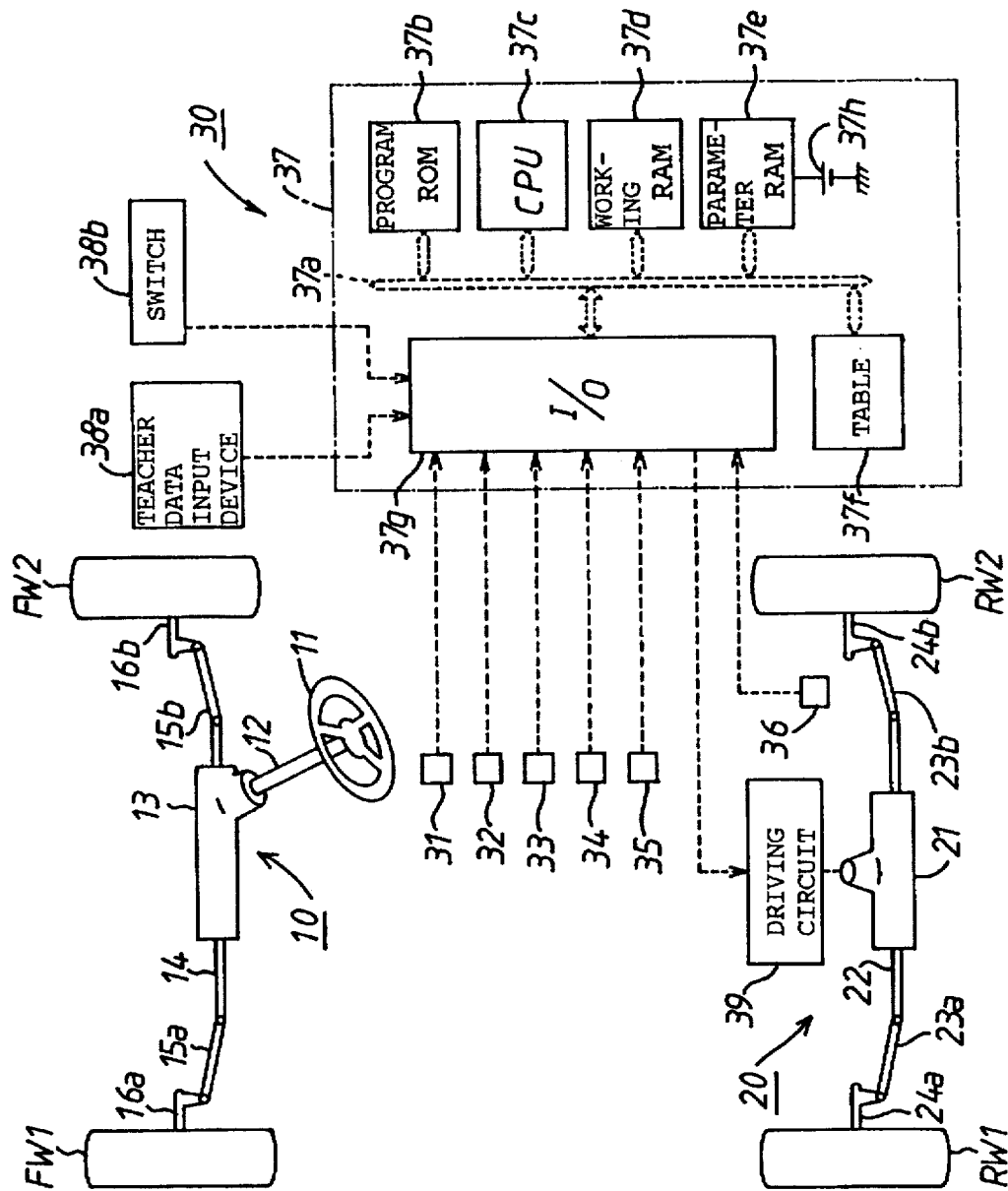
FIG. 1 is a schematic illustration of a four-wheel steering system of an automotive vehicle.

In FIG. 1 of the drawings, there is schematically illustrated a four-wheel steering system of an automotive vehicle for controlling a travel characteristic of the vehicle. The four-wheel steering system includes a front wheel steering mechanism 10 for a set of dirigible front road wheels FW1, FW2, a rear wheel steering mechanism 20 for a set of dirigible rear road wheels RW1, RW2, and an electric control system 30 for electrically controlling operation of the rear wheel steering mechanism 20.

The front wheel steering mechanism 10 comprises a steering shaft 12 provided at its upper end with a steering handle 11 and operatively connected at its lower end to a rack bar 14 which is mounted within a steering gear box 13 to be axially displaced in accordance with rotation of the steering handle 11. The rack bar 14 is connected at its opposite ends with the front road wheels FW1, FW2 by means of a pair of tie rods 15a, 15b and a pair of knuckle arms 16a, 16b. The front road wheels FW1, FW2 are steered in accordance with axial displacement of the rack bar 14. The rear wheel steering mechanism 20 comprises an electrically controlled actuator 21 arranged to effect axial displacement of a relay rod 22 in its operation. The relay rod 22 is connected at its opposite ends with the rear road wheels RW1, RW2 by means of a pair of tie rods 23a, 23b and a pair of knuckle arms 24a, 24b. The rear road wheels RW1, RW2 are steered in accordance with axial displacement of the relay rod 22.

The electric control system 30 includes a microcomputer 37 connected to a yaw rate sensor 31, a vehicle speed sensor 32, a handle steering angle sensor 33, an accelerator sensor 34, a brake sensor 35 and a rear wheel steering angle sensor 36. The yaw rate sensor 31 is arranged to detect a rotational angle speed of the vehicle body about a vertical axis for producing an electric signal indicative a yaw rate $\tau$ of the vehicle body. The vehicle speed sensor 32 is arranged to detect a rotation speed of an output shaft of the vehicle transmission (not shown) for producing an electric signal indicative of a travel speed of the vehicle. The handle steering angle sensor 33 is arranged to detect a steering angle $\theta f$ of handle 11 for producing an electric signal indicative of the steering angle $\theta f$ of handle 11. The accelerator sensor 34 is arranged to detect a depression angle of an accelerator pedal (not shown) of the vehicle for producing an electric signal indicative of a throttle angle Ac of a prime engine of the vehicle. The brake sensor 35 is arranged to detect a depression angle of a brake pedal (not shown) of the vehicle for producing an electric signal indicative of the depression amount Br of the brake pedal. The rear wheel steering angle sensor 36 is arranged to detect a steering angle θr of the rear road wheels RW1, RW2 for producing an electric signal indicative of the detected steering angle θr. In this embodiment, the yaw rate τ, the handle steering angle θf and the rear wheel steering angle θr each are represented as a positive value in a rightward turning direction and as a negative value in a leftward turning direction.

The microcomputer 37 has a read-only memory or ROM 37b, a central processing unit or CPU 37c, a working RAM 37d, a parameter RAM 37e, a coefficient table 37f and an input-output device or I/O 37g connected in common to a bus 37. The ROM 37b is arranged to memorize a main control program shown by flow charts in FIGS. 2-4. The CPU 37c includes therein a timer and is arranged to repeat execution of the control program at a time interval defined by the timer. The working RAM 37d is arranged to temporarily memorize variables necessary for execution of the control program. The parameter RAM 37e is backed up by a vehicle battery 37h to preliminarily memorize connection coefficients $\omega_{0i}$, $\omega_{1ij}$, $\omega_{2j}$ and threshold values $\theta_{0i}$, $\theta_{1j}$, $\theta_2$ respectively for input, intermediate and output layers of a neural network realized by the control program.

Figure 5:
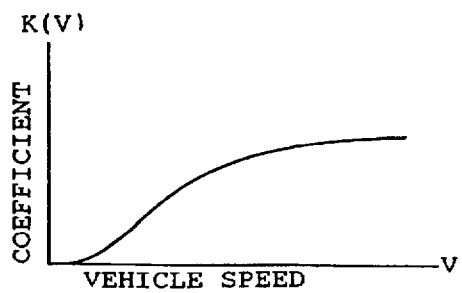
FIG. 5 is a graph showing a coefficient K(V) in relation to a travel speed of the vehicle.

In this embodiment, the connection coefficients $\omega_{0i}$, $\omega_{1ij}$, $\omega_{2j}$ and threshold values $\theta_{0i}$, $\theta_{1j}$, $\theta_2$ are determined by learning under a back-propagation method in common for all the control devices prior to manufacturing the control system. The connection coefficients $\omega_{0i}$, $\omega_{1ij}$, $\omega_{2j}$ and threshold values $\theta_{0i}$, $\theta_{1j}$, $\theta_2$ can be rewritten by learning under the back-propagation method even after manufacturing of the control system. The coefficient table 37f is in the form of a read-only memory or ROM arranged to preliminarily memorize a coefficient K(V) which gradually increases in accordance with an increase of the vehicle speed V as shown in FIG. 5. The I/O 37g is connected to the sensors 31-36 and to a teacher data input device 38a, a changeover switch 38b and a driving circuit 39. The teacher data input device 38a is in the form of a set of ten keys arranged to be operated for applying appropriate values as a teacher data to the microcomputer 37. The changeover switch 38b is in the form of a normally open switch which is arranged to permit renewal of the connection coefficients $\omega_{0i}$, $\omega_{1ij}$, $\omega_{2j}$ and threshold values $\theta_{0i}$, $\theta_{1j}$, $\theta_2$ in the parameter RAM 37e when it has been closed. The driving circuit 39 is arranged to control activation of the actuator 21 in response to a control signal applied thereto from the computer 37.

Figure 3:
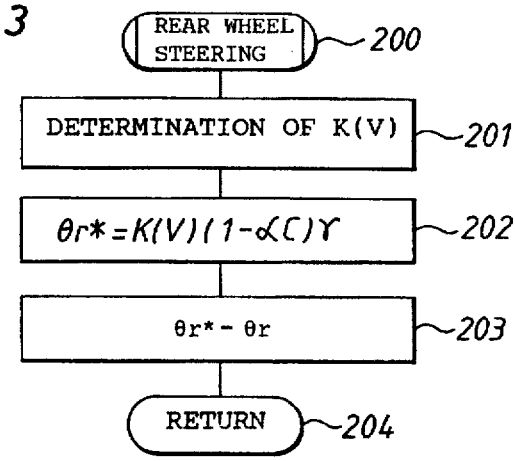
FIG. 3 is a flow chart of a rear wheel steering routine respectively shown in FIGS. 2 and 4.
Figure 4:
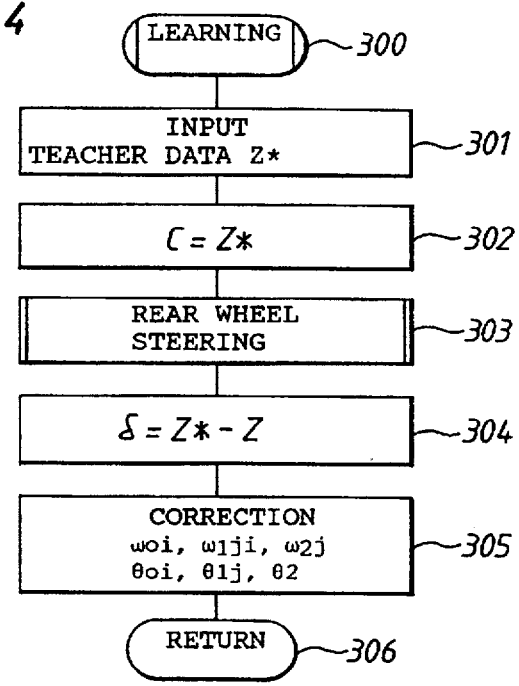
FIG. 4 is a flow chart of a learning routine shown in FIG. 2.

Hereinafter, the operation of the electric control system will be described in detail with reference to flow charts shown in FIGS. 2 to 4. When an ignition switch (not shown) of the vehicle is turned on, the computer 37 repeats execution of the control program at a predetermined time interval at step 100 to 111 shown in FIG. 2. At step 101 of the program, the computer 37 reads out a yaw rate τ, a vehicle speed V, a handle steering angle θf, an opening degree Ac of the engine throttle, a depression amount Br of the brake pedal and a rear wheel steering angle θr represented by electric signals from sensors 31-36. When the program proceeds to step 102, the computer 37 calculates the following equations (1), (2) to detect positional change amounts X, Y of the vehicle indicated on an X, Y coordinate.

$$X = V\sin(\int \tau dt) \quad (1)$$
$$Y = V\cos(\int \tau dt) \quad (2)$$

At the following step 103, the computer 37 renews time-series data TDi(i=1-m) related to the calculated positional change amounts X, Y, the vehicle speed V, handle steering angle τf, opening degree Ac of the engine throttle and depression amount Br of the brake pedal. The time-series data TDi are always memorized in the working RAM 37d as data of m values (for example, sixty values) representing each predetermined number (for example, ten) of the amounts read out at the predetermined time interval. When renewed at step 103, the oldest data are eliminated, and the other data are successively shifted on a time-axis and added with fresh data newly read out at step 101.

Figure 6:
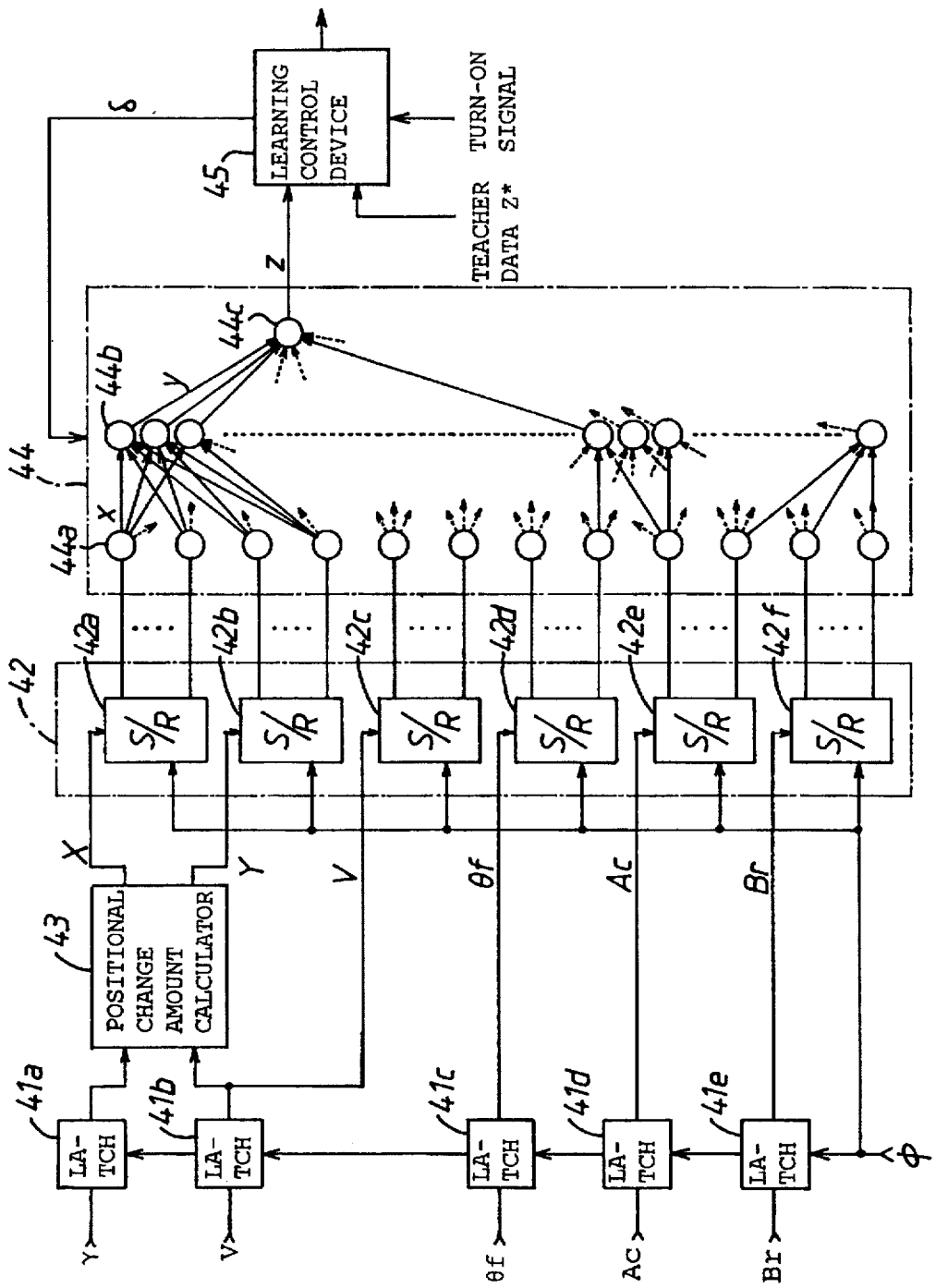
Figure 7:
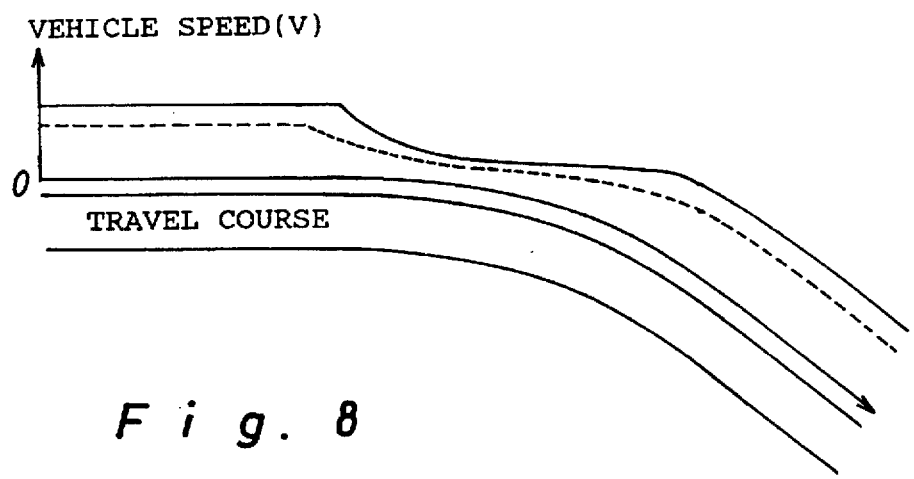
FIG. 7 is a graph showing a travel speed of the vehicle on a curved road in relation to a driving characteristic of the driver.
Figure 8:
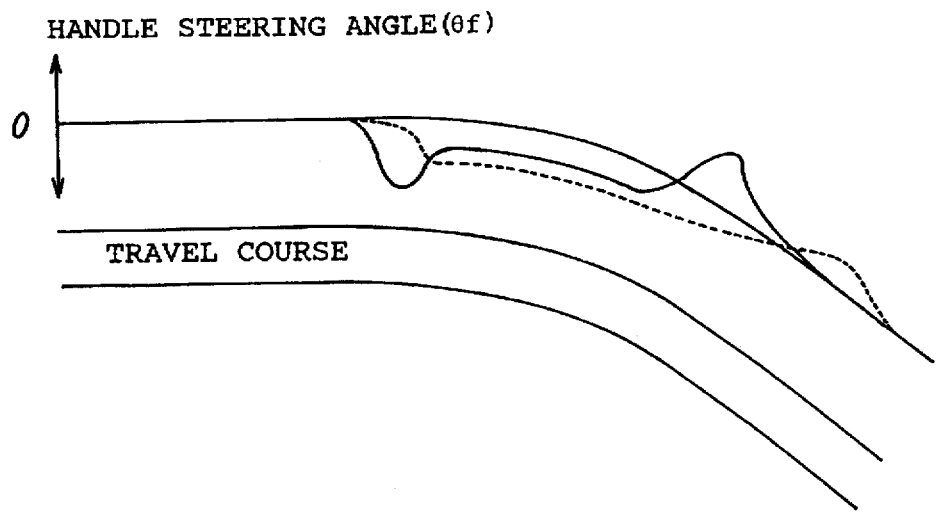
FIG. 8 is a function block diagram equivalent to a neural network calculation executed by the computer.
Figure 9:
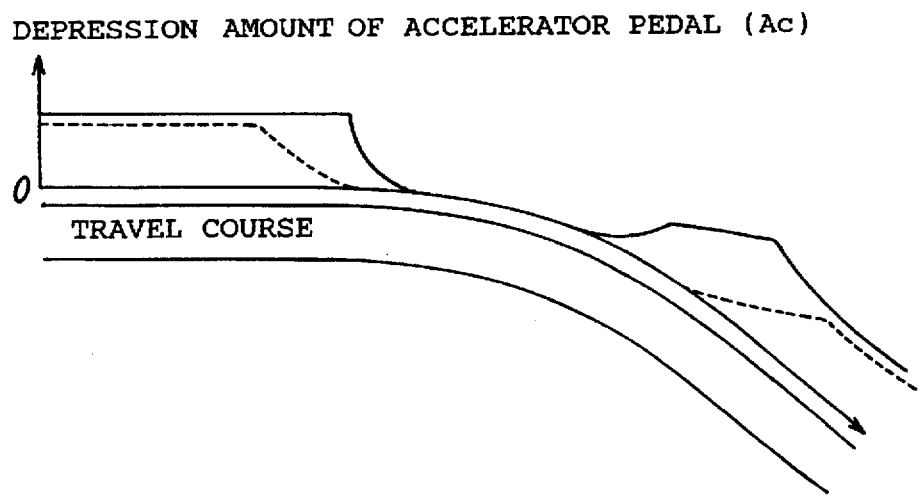
FIG. 9 is a graph showing a depression amount of the vehicle accelerator pedal in relation to the driving characteristic of the driver.
Figure 10:
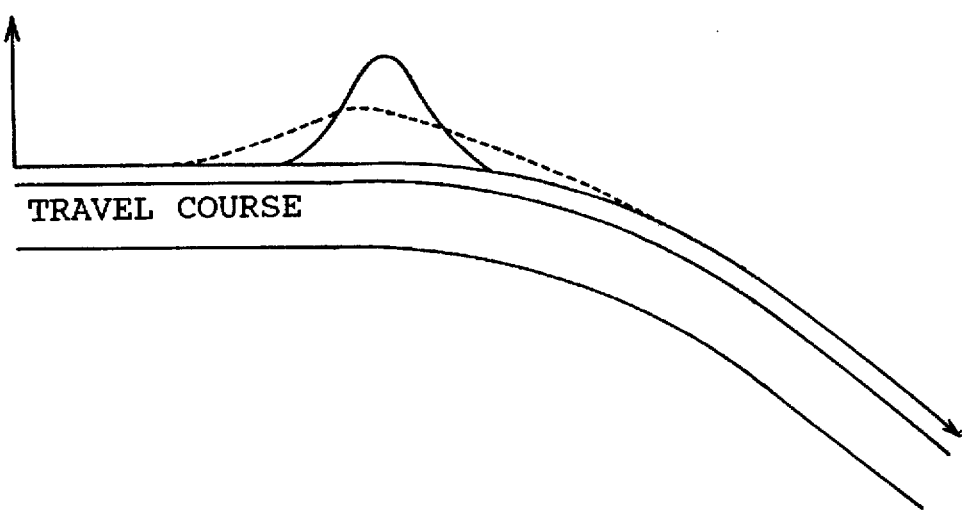
FIG. 10 is a graph showing a depression amount of the vehicle brake pedal in relation to the driving characteristic of the driver.

For better understanding of processing at step 101-103. A functional block diagram equivalent to the processing at step 101-103 is shown in FIG. 6. The yaw rate τ, vehicle speed V, handle steering angle θf, opening degree Ac of the engine throttle and depression amount Br of the brake pedal are applied to latch circuits 41a-41e at the predetermined time interval defined by a duration of a clock signal φ. The latched vehicle speed V, handle steering angle θf, opening degree Ac of the engine throttle and depression amount Br of the brake pedal are applied as an amount of driving conditions of the vehicle to shift registers 42c-42f in a time-series circuit 42, while the latched yaw rate τ and vehicle speed V are applied to a positional change amount calculator 48 and converted by calculation of the above equations (1), (2) at the calculator 43 into positional change amounts X, Y representing a positional change condition of the vehicle on the X, Y coordinate at the predetermined time interval. The positional change amounts X, Y are applied to shift registers 42a, 42b in the time-series circuit 42. The shift resisters 42a-42f each are composed of a predetermined number of registers (for example, ten registers) which are arranged to transfer the positional change amounts X, Y, yaw rate τ, vehicle speed V, handle steering angle θf, opening degree Ac of the engine throttle and depression amount Br of the brake pedal at the predetermined time interval for forming the number m of time-series data TD$_i$(i=1-m) consisting of the values X, Y, τ, V, θf, Ac, Br transferred at the predetermined time interval.

Figure 2:
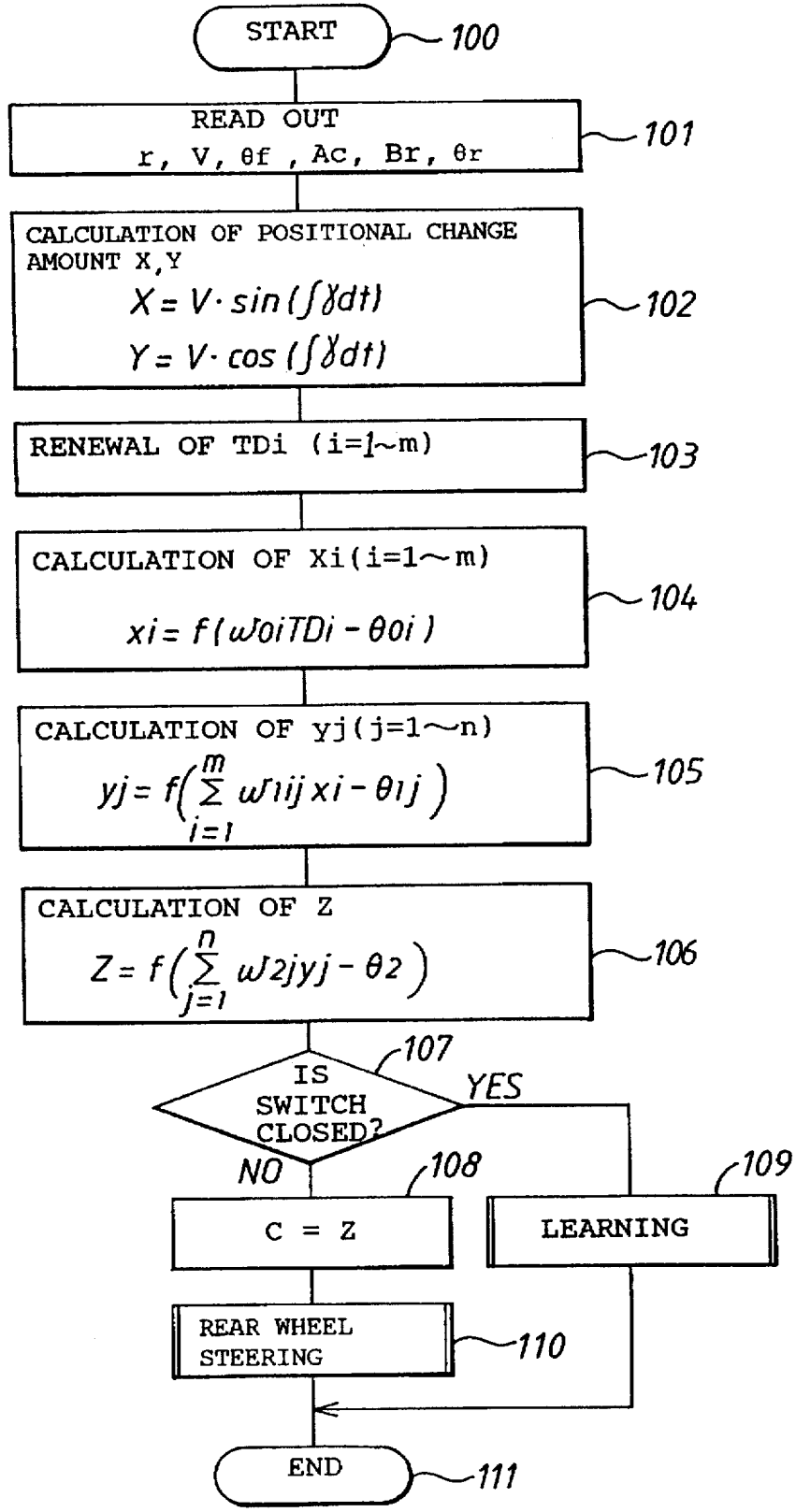
FIG. 2 is a flow chart of a main control program executed by a microcomputer shown in FIG. 1.

Referring back to the flow chart shown in FIG. 2, the computer 37 executes calculation of the following equations (3)-(5) at step 104 to 106 on a basis of the time-series data TD$_i$ and the connection coefficients $\omega_{0i}$, $\omega_{1ij}$, $\omega_{2j}$ and threshold values $\theta_{0i}$, $\theta_{1j}$, $\theta_2$ memorized in the parameter RAM 37e.

$$x_i = f(\omega_{0i} TD_i - \theta_{0i}) \quad (3)$$

$$y_j = f\left(\sum_{i=1}^{m} \omega_{1ij} x_i - \theta_{1j}\right) \quad (4)$$

$$z = f(\Sigma \, \omega_{2j} y_j - \theta_2) \quad (5)$$

where i is an integer of 1 to m, j is an integer of 1 to n, f(x) is a function such as a step function or a sigmoid function. The final resultant value z of calculation of the equations (3)-(5) represents a driving characteristic of the driver and is called as a characteristic index z hereinafter. The characteristic index z represents an intent to a sports-drive by "1", an intent to a safety-drive by "−1" or a degree from the sports-drive to the safety-drive by a medium value.

The processing at step 104-106 corresponds with a neural network 44 of the function block shown in FIG. 6. More specifically, the processing at step 104 corresponds with an input layer composed of the number m of input units 44a, 44a . . . 44a, the processing at step 105 corresponds with an intermediate layer composed of the number n of intermediate units 44b, 44b . . . 44b, and the processing at step 106 corresponds with an output layer composed of an output unit 44c. in this embodiment, the driving characteristic of the driver is estimated by the processing at step 104-106 for the following reason. The driving characteristic of the driver can be appreciated by grasping a driving condition of the vehicle on a travel road as described below.

A travel course or locus of the vehicle can be detected on a basis of positional change amounts X, Y of the vehicle on the X, Y coordinate calculated by the above equations (1) and (2). Assuming that the vehicle has travelled on a curved road as shown in FIGS. 7 to 10, the driver with Intent to a sports-drive enters into the curved road at a relatively high speed and rapidly decelerates the vehicle speed V immediately before the corner of the road as shown by a solid line in FIG. 7, while the driver with intent to a safety-drive enters into the curved road at a relatively low speed and gradually decelerates the vehicle speed before the corner of the road as shown by a broken line in FIG. 7. In steering of the vehicle, the former driver with intent to a sports-drive rapidly steers the steering handle at a large angle before entering into the corner of the curved road as shown by a solid line in FIG. 8, while the latter driver with intent to a safety-drive slowly steers the steering handle before entering into the corner of the curved road as shown by a broken line in FIG. 8. In acceleration of the vehicle, the former driver continuously depresses the accelerator pedal until entering into the corner of the curved road and accelerates the vehicle on the way out of the corner as shown by a solid line in FIG. 9, while the latter driver releases depression of the accelerator pedal before entering into the corner and accelerates the vehicle after passing the corner as shown by a broken line in FIG. 9. In braking operation of the vehicle, the former driver rapidly depresses the brake pedal before entering into the corner of the curved road as shown by a solid line in FIG. 10, while the latter driver slowly depresses the brake pedal before entering into the corner as shown by a broken line in FIG. 10.

With such travel of the vehicle as described above, the connection coefficients $\omega_{Oi}$, $\omega_{1ij}$, $\omega_{2j}$ and threshold values $\theta_{Oi}$, $\theta_{1j}$, $\theta_2$ are learned by the back-propagation method in such a manner that the characteristic index $z$ becomes either "1", "−1", or a "medium value" in the range "−1" and "1", and the resultant of learning is memorized in the parameter RAM 37e. Thus, the characteristic index $z$ is calculated by processing at 104 to 106 or calculation at the neural network 44 to represent the driving characteristic of the driver.

Referring back to the flow chart shown in FIG. 2, the computer 37 determines at step 107 the position of the changeover switch 38b after processing at step 106. Since the changeover switch 38b is normally retained in an open-position, the computer 37 determines a "No" answer at step 107, sets the calculated characteristic index z as a variable $c$ at step 108 and executes a rear wheel steering routine at step 110. As shown in detail in FIG. 3, the computer 37 initiates execution of the rear wheel steering routine at step 200 and determines a coefficient K(V) in accordance with the vehicle speed V on a basis of the coefficient table 37f shown in FIG. 5. At the following step 202, the computer 37 calculates the following equation (6) to determine a target rear wheel steering angle θr*.

$$\theta r^* = K(V).(1-\alpha.c).\tau$$

where α is previously determined as a positive constant less than "1".

At the following step 203, the computer 37 produces a control signal indicative of a difference between the target rear wheel steering angle θr* and the detected steering angle θr and applies it to the driving circuit 39. Thus, the driving circuit 39 activates the actuator 21 in accordance with the control signal, and the relay rod 22 is axially displaced by activation of the actuator 21 in an amount defined by the difference between the target rear wheel steering angle θr* and the detected steering angle θr to steer the rear road wheels RW1, RW2 at the target steering angle θr*. As a result, the steerage of rear road wheels RW1, RW2 is controlled in proportion to the yaw rate τ acting on the vehicle, and the gain of the rear wheel steering is corrected in accordance with the coefficient K(V) and variable $c$. In this instance, the coefficient K(V) is determined to be a positive value as shown in FIG. 5, the value α to be a positive constant less than "1", and the variable c to be more than "−1" and less than "1". Accordingly, the gain K(V). (1−α.c) becomes a positive value, and the target rear wheel steering angle θr* becomes the same sign as the yaw rate τ. Thus, the rear road wheels RW1, RW2 are steered in the same direction as the yaw rate τ to restrain the yaw rate τ, and the gain K(V) (1−αc) increases in accordance with an increase of the vehicle speed (V). This is effective to greatly enhance the travel stability of the vehicle.

Figure 11:
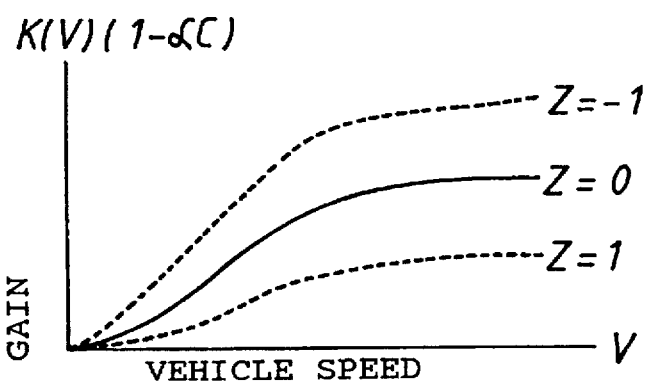
FIG. 11 is a graph showing a gain of the rear road wheels in relation to a travel speed of the vehicle.

In the case that the driving characteristic of the driver changes from an intent to a safety-drive to an intent to a sports-drive, the variable $c$ (the characteristic exponent z) changes toward "1" from "−1", and the gain K(V).(1−α.c) decreases as shown in FIG. 11. Accordingly, if the driving characteristic of the driver is in an intent to a safety-drive, an absolute value of the target rear wheel steering angle θr* increases to enhance the travel stability of the vehicle for providing a driving characteristic suitable for the driver. If the driving characteristic of the driver is in an intent to a sports-drive, an absolute value of the target rear wheel steering angle θr* decreases to enhance the turning ability of the vehicle for providing a driving characteristic suitable for the driver.

For renewal of the connection coefficients $\omega_{Oi}$, $\omega_{1ij}$, $\omega_{2j}$ and threshold values $\theta_{Oi}$, $\theta_{1j}$, $\theta_2$ in the parameter RAM 37e, the driver operates the teacher data input device 38a to set a teacher data z* corresponding with the characteristic index z and turns on the changeover switch 38b. In such a condition, the driver drives the vehicle at a driving characteristic defined by the teacher data z*. In operation of the teacher data input device 38a, the teacher data z* is selectively set as "1" indicative of intent to a sports-drive, "−1" indicative of intent to a safety-drive or an intermediate value between "1" and "−1". In this instance, the computer 37 determines a "Yes" answer at step 107 after determining the characteristic index z by processing at step 101 to 106 and executes a learning routine at step 109. As shown in detail in FIG. 4, the computer 37 initiates execution of the learning routine at step 300, reads out the teacher data z* at step 301 and sets the teacher data z* as a variable c at step 302. Thereafter, the computer 40 executes the rear wheel steering routine at step 303 in the same manner as described above to steer the rear road wheels RW1, RW2 at a target steering angle defined by the teacher data z*.

After processing at step 303, the computer 37 calculates at step 304 a deviation δ between the teacher data z* and the previously calculated characteristic index z and renews at step 305 the previously memorized connection coefficients $\omega_{Oi}$, $\omega_{1ij}$, $\omega_{2j}$ and threshold values $\theta_{Oi}$, $\theta_{1j}$, $\theta_2$ by the back-propagation method in such a manner as to minimize the deviation δ (=z*−z). The processing at step 301, 304 and 305 corresponds with a learning control device 45 in the function block shown in FIG. 6. The learning control device 45 is applied with the characteristic index z indicative of the driving characteristic of the driver from an output unit 44c in the function block and issues therefrom the characteristic index z as it is if the changeover switch 38b is in its open position. If the changeover switch 38b is closed, the learning control device 45 issues the teacher data z* applied from the teacher data input device 38a and supplies the deviation δ (=z*−z) to the neural network 44. In this instance, the neural network 44 renews the previously memorized connection coefficients $\omega_{0i}$, $\omega_{1ij}$, $\omega_{2j}$ and threshold values $\theta_{0i}$, $\theta_{1j}$, $\theta_2$ by the back-propagation method in such a manner as to minimize the deviation δ (=z*−z).

From the above description, it will be understood that the travel course of the vehicle is detected by the processing at step 102 and the characteristic index z indicative of the driving characteristic of the driver is estimated by the processing at steps 104 to 106 or calculation at the neural network. In the present invention, the estimated characteristic index z is adapted to automatically change the gain of the rear wheel steering amount for controlling the travel characteristic of the vehicle in accordance with the driving characteristic of the driver. Furthermore, the estimated characteristic index z can be set as an intermediate value between "−1" and "1" for more precisely controlling the travel characteristic of the vehicle in accordance with the driver's requirements.

Although in the above embodiment the yaw rate τ and vehicle speed V have been adapted to detect the travel course of the vehicle, a lateral acceleration may be utilized in replacement with the yaw rate. The travel course of the vehicle may be detected by a navigation system using a positional information applied from a position detector installed on a travel road or a satellite station. Although in the above embodiment the yaw rate τ has been adapted to detect movement conditions of the vehicle, the lateral acceleration and vehicle speed may be adapted in replacement with the yaw rate. Although in the above embodiment, the travel characteristic of the vehicle has been controlled by steerage of the rear road wheels, it may be controlled by correction of the steering angle of the front road wheels or control of the vehicle suspension system. Furthermore, the software of the neural network may be replaced with a hardware such as the function block shown in FIG. 6.

What is claimed is:

1. An electric control system for controlling a travel characteristic of an automotive vehicle, comprising:

input means for setting a teacher data indicative of a driver's intent to drive;

first detection means for detecting a driving condition of the vehicle;

second detection means for detecting movement conditions of the vehicle;

third detection means for calculating positional change amounts of the vehicle based on the detected movement conditions of the vehicle;

renewal means for renewing a time-series data of the detected driving condition and the calculated positional change amounts at a predetermined time interval and for detecting a travel locus of the vehicle on a basis of the time-series data;

memory means for memorizing a plurality of predetermined parameters;

a neural network for estimating a characteristic index indicative of a driving characteristic of a driver on a basis of the memorized parameters and the time-series data of the detected driving condition and the calculated positional change amounts and for renewing the memorized parameters in such a manner as to minimize a difference between an index defined by the teacher data and the estimated characteristic index;

means for producing a control signal for control of the travel characteristic of the vehicle in accordance with the detected movement conditions of the vehicle; and correction means for correcting the control signal in accordance with the estimated characteristic index.

2. An electric control system as claimed an claim 1, wherein said first detection means comprises a handle steering angle sensor for detecting a steering angle of a steering handle of the vehicle, an accelerator sensor for detecting a depression angle of an accelerator pedal of the vehicle, a speed sensor for detecting a travel speed of the vehicle, and a brake sensor for detecting a depression angle of a brake pedal of the vehicle.

3. An electric control system as claimed in claim 1, wherein said second detection means comprises a yaw rate sensor for detecting a yaw rate of the vehicle and a speed sensor for detecting a travel speed of the vehicle.

4. An electric control system as claimed in claim 3, wherein said third detection means comprises means for calculating the positional change amounts of the vehicle on an X, Y coordinate based on the yaw rate and travel speed of the vehicle respectively detected by said yaw rate sensor and said speed sensor.

5. An electric control system as claimed in claim 3, wherein said third detection means comprises means for calculating the positional change amounts of the vehicle based on the following equations and indicated on an X, Y coordinate:

$$X = V \sin(\int\tau dt)$$

$$Y = V \cos(\int\tau dt)$$

where V is the travel speed detected by said speed sensor, and τ is the yaw rate detected by said yaw rate sensor.

6. An electric control system as claimed in claim 1, wherein said memory means comprises means for memorizing a plurality of connection coefficients and a plurality of threshold values to be renewed by learning based on the teacher data.

7. An electric control system as claimed in claim 1, wherein said first detection means comprises a speed sensor for detecting travel speed of the vehicle and a steering angle sensor for detecting a steering angle of a set of dirigible rear road wheels of the vehicle, and wherein said means for producing a control signal comprises first means for setting the estimated characteristic index as a variable, second means for determining a coefficient in accordance with the detected travel speed of the vehicle, third means for determining a target rear wheel steering angle on a basis of the variable and the coefficient, and fourth means for producing a control signal indicative of a difference between the target rear wheel steering angle and the detected steering angle of the rear road wheels.

* * * * *